E. H. BARNEY.
LIFE SAVING SLED.
APPLICATION FILED JAN. 18, 1910.
981,360.
Patented Jan. 10, 1911.
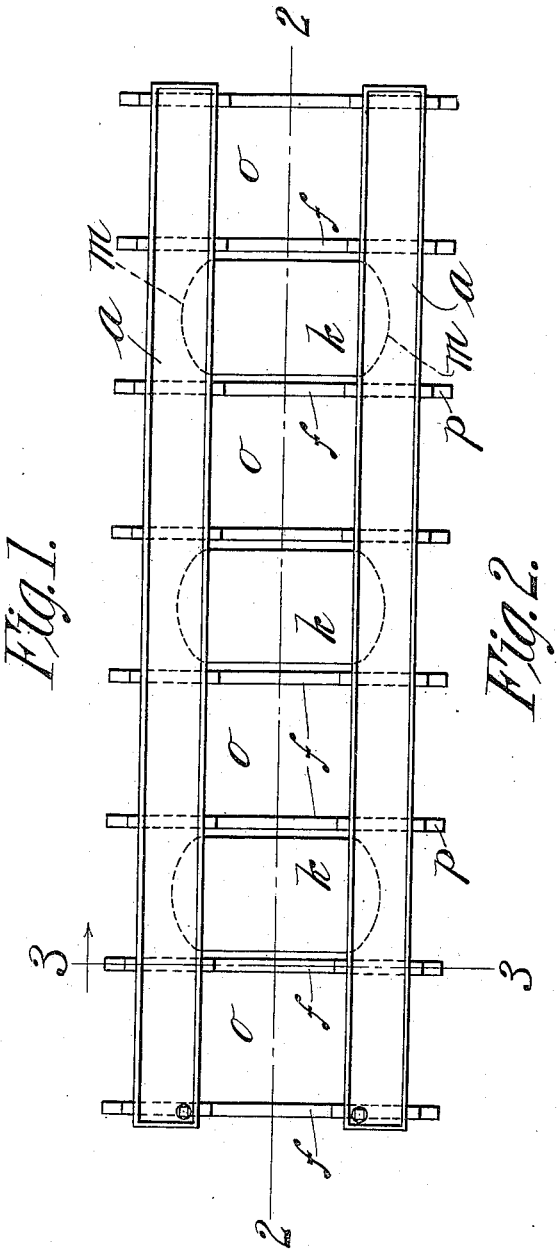
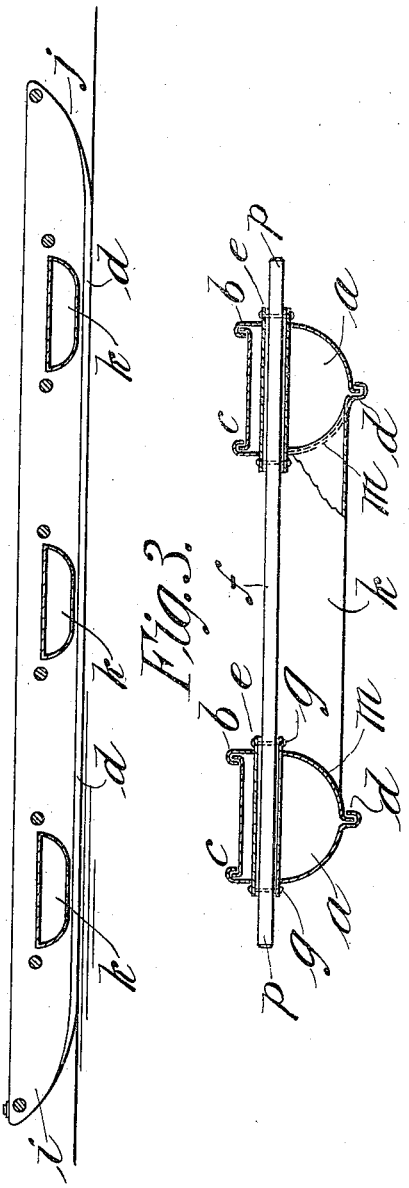
WITNESSES:
H. L. Sprague
Harry W. Bown
INVENTOR.
Everett H. Barney.
BY
Chapin &Co.
ATTORNEY.

UNITED STATES PATENT OFFICE.

EVERETT H. BARNEY, OF SPRINGFIELD, MASSACHUSETTS.

LIFE-SAVING SLED.

981,360.

Specification of Letters Patent. Patented Jan. 10, 1911.

Application filed January 18, 1910. Serial No. 538,700.

*To all whom it may concern:*

Be it known that I, EVERETT H. BARNEY, a citizen of the United States of America, residing at Springfield, in the county of Hampden and State of Massachusetts, have invented new and useful Improvements in Life-Saving Sleds, of which the following is a specification.

This invention relates to improvements in life-saving sleds in which a pair of hollow, water-tight, metallic casings are employed, and means for adjusting the same.

The objects of the invention are, first, to provide a structure that is especially adapted for rescuing persons who may have broken through the ice while skating, and, second, a structure that can be adapted for use on both ice and in water.

I attain the foregoing recited objects by means of the structure shown in the accompanying drawings, in which,—

Figure 1 is a plan view of the invention showing the general arrangement and location of the parts. Fig. 2 is a longitudinal sectional view on the line 2—2, Fig. 1, clearly showing the longitudinally spaced buoyant casings, and Fig. 3 is a transverse sectional view on the line 3—3, Fig. 1, the view being taken through one of the spacing and securing bars.

Similar letters refer to the same parts in the several views.

The water-tight floats $a$ extend longitudinally the entire length of the structure and are preferably made of sheet metal of boat-shape form, as shown in cross-section in Fig. 3. The water-tight joints $b$, $c$, and $d$ of the plates composing the floats $a$ are rolled or folded together in the usual manner, and soldered. Extending transversely through the floats $a$ are a series of longitudinally spaced tubular elements $e$ which are for the purpose of receiving the rods $f$, whereby the floats $a$ may be spaced a suitable distance from each other. The fastening devices $g$ are passed through the tubular elements $e$ for securing the rods $f$ to the floats.

It should be noticed that the opposite ends of the floats are formed with upwardly extending curved portions $i$ and $j$ so that the structure will readily pass over any obstructions that may occur when in use, as a sled on the ice or snow.

The two floats, when assembled with the spacing rods $f$, constitute, in effect, a catamaran structure, the beaded portions $d$ serving as runners when used on the ice, while the floats $a$ serve to float the structure when in the water.

$k$ designates a series of hollow air and water-tight casings that are located between the floats $a$, and the rods $f$. These casings are attached to the floats $a$, as shown at $m$, in any suitable manner, as by riveting or soldering, and extend practically flush with the upper edge of the rods $f$.

It will be observed that the casings $k$ are alternately disposed between the rods $f$, whereby openings $o$ are provided in order that a person may be rescued from the water by another person who may be standing on the float, it being understood that when the sled is used in this manner it is placed across a break in the ice, or it may be in the water. These openings $o$ serve the additional purpose of permitting the person to be rescued to pass an arm therethrough and grasp the rods $f$, and thus pull himself upward onto the upper or top portion of the float.

The end portions $p$ of the rods $f$ provide a means for the persons or person to be rescued to conveniently seize the structure and thus materially aid himself in leaving the water.

It will be observed that the folded joints $d$ serve also as runners for the sled when in use.

It will therefore be seen that I have produced a life-saving structure that is readily adapted to be thrown across a break in the ice and one that is light in weight, rigid, and one that can be constructed at a small cost, and is practically free from breakage or repairs.

What I claim, is:—

In a life-saving sled, a pair of longitudinally disposed hollow, metallic floats, and air and water-tight, the opposite ends of the floats being curved, each float having a plurality of tubular elements arranged transversely thereof, rods extending from one float to the other and passing through the tubular elements, and projecting beyond the outer sides of the floats, fastening devices g extending through the tubular elements for securing the rods to the floats and spacing the same from each other, and a series of water-tight casings interposed between the floats and alternately disposed between the rods, whereby openings are produced between the floats and rods, as described.

EVERETT H. BARNEY.

Witnesses:
 Wm. H. Chapin,
 K. I. Clemons.